(12) United States Patent
Suzuki

(10) Patent No.: US 10,139,009 B2
(45) Date of Patent: Nov. 27, 2018

(54) ELECTROMAGNETIC VALVE

(71) Applicant: Hamanakodenso Co., Ltd., Kosai, Shizuoka-Pref. (JP)

(72) Inventor: Kengo Suzuki, Hamamatsu (JP)

(73) Assignee: Hamanakodenso Co., Ltd., Kosai, Shizuoka-Pref. (JP)

( * ) Notice: Subject to any disclaimer, the term of this patent is extended or adjusted under 35 U.S.C. 154(b) by 0 days.

(21) Appl. No.: 15/096,773

(22) Filed: Apr. 12, 2016

(65) Prior Publication Data

US 2016/0298786 A1    Oct. 13, 2016

(30) Foreign Application Priority Data

Apr. 13, 2015  (JP) ................................ 2015-081914

(51) Int. Cl.
*F16K 31/06*    (2006.01)

(52) U.S. Cl.
CPC ...... *F16K 31/0665* (2013.01); *F16K 31/0631* (2013.01)

(58) Field of Classification Search
CPC .......................... F16K 31/0631; F16K 31/0665
USPC .................................................. 251/129.15
See application file for complete search history.

(56) References Cited

U.S. PATENT DOCUMENTS

| | | | | |
|---|---|---|---|---|
| 3,451,429 A * | 6/1969 | Vick | ................... | F16K 31/0631 137/625.65 |
| 4,767,097 A * | 8/1988 | Everett | ............... | F16K 31/0665 251/129.08 |
| 4,998,559 A * | 3/1991 | McAuliffe, Jr. | ..... | F16H 61/0251 137/596.17 |
| 5,549,274 A * | 8/1996 | Buchanan | ............ | F02M 59/466 251/129.14 |
| 5,630,569 A * | 5/1997 | Oehler | .................... | B60T 8/363 137/596.17 |
| 5,651,391 A * | 7/1997 | Connolly | ............ | F15B 13/0405 137/454.6 |
| 6,184,766 B1 * | 2/2001 | Kojima | ................. | F16K 27/003 251/129.14 |
| 8,127,788 B2 * | 3/2012 | Yamashita | .............. | B60T 8/368 137/315.03 |
| 2002/0145125 A1 * | 10/2002 | Tomoda | .............. | F16K 31/0631 251/129.15 |
| 2002/0166591 A1 * | 11/2002 | Cristiani | ............. | F16K 31/0631 137/625.65 |

(Continued)

FOREIGN PATENT DOCUMENTS

| | | | |
|---|---|---|---|
| DE | 4026231 A1 * | 2/1992 | ......... F16K 31/0606 |
| DE | 10255524 A1 * | 6/2003 | ............ F15B 13/044 |
| JP | 4093092 B2 | 5/2008 | |

*Primary Examiner* — R. K. Arundale
*Assistant Examiner* — Jonathan Waddy
(74) *Attorney, Agent, or Firm* — Harness, Dickey & Pierce, P.L.C.

(57) ABSTRACT

An electromagnetic valve includes: a housing, a ball valve, a ball guide to hold the ball valve, a shaft that displaces the ball valve; an electromagnetic solenoid part that drives the shaft; a seat component; and a seal member. The seat component has a cylindrical portion disposed inside of the housing, and has a predetermined depth in an axial direction. An inflow valve port passes through a first end of the cylindrical portion in the axial direction. The seal member is coupled with an outer circumference part of the housing at a position corresponding to the cylindrical portion.

15 Claims, 3 Drawing Sheets

(56) References Cited

U.S. PATENT DOCUMENTS

| | | | |
|---|---|---|---|
| 2007/0068585 A1* | 3/2007 | Nagasaki | F16K 27/0245 137/625.65 |
| 2011/0203682 A1* | 8/2011 | Ishikawa | F16H 61/12 137/487.5 |
| 2014/0311440 A1* | 10/2014 | Lee | F01M 1/16 123/196 CP |
| 2015/0129785 A1* | 5/2015 | Kai | F16K 31/082 251/65 |

* cited by examiner

ELECTROMAGNETIC VALVE

CROSS REFERENCE TO RELATED APPLICATION

This application is based on Japanese Patent Application No. 2015-81914 filed on Apr. 13, 2015, the disclosure of which is incorporated herein by reference in its entirety.

TECHNICAL FIELD

The present disclosure relates to an electromagnetic valve.

BACKGROUND

JP 4093092 B2 describes an electromagnetic valve including a cylindrical housing and an electromagnetic solenoid. The housing has an inflow port for oil corresponding to operation fluid, and a ball valve mechanism at the end. The electromagnetic solenoid is arranged to be opposite from an inflow cylindrical part. A shaft is disposed inside of the housing, and reciprocated by the electromagnetic solenoid to open and close the ball valve mechanism. A filter chamber is defined inside of the housing, and a ring board is fitted to the downstream side downstream of the filter chamber in the axial direction. An inflow valve port is defined at the center of the ring board.

A valve chamber is defined downstream of the ring board in the axial direction. An outlet port for operation fluid is defined on a lateral side of the valve chamber. An outflow valve port is defined on the downstream end of the valve chamber in the axial direction. A cylindrical ball guide is inserted into the valve chamber, and the ball valve is received by the ball guide, such that the ball valve mechanism is formed. A discharge channel and a shaft holding part are formed downstream of the outflow valve port in the axial direction, and the discharge port intersects the discharge channel.

SUMMARY

In JP 4093092 B2, a seal member such as O ring seal may be disposed around the outer circumference part of the housing to improve the seal performance between the cylindrical housing and a passage formation component which forms an upstream passage upstream of the inflow port of the housing. However, a space for receiving such O ring seal is not securable in JP 4093092 B2, since the thickness of the housing is small. In other words, such O ring seal cannot be mounted to the electromagnetic valve. If the thickness of the housing is increased to secure a space for receiving such O ring seal, the outer diameter of the housing will be large.

It is an object of the present disclosure to provide an electromagnetic valve in which a sealing component is disposed on an outer side of a housing having an oil inflow port while the outer diameter of the housing is restricted from increasing.

According to an aspect of the present application, an electromagnetic valve includes a housing, a ball valve, a ball guide, a shaft, an electromagnetic solenoid part, a seat component and a seal member. The housing has: an outflow valve port opposing an inflow valve port of oil corresponding to operation fluid in an axial direction, an outlet port defined on a lateral side of the housing, and a valve chamber located between the inflow valve port and the outflow valve port, and communicated with the inflow valve port, the outflow valve port, and the outlet port. The ball valve is disposed in the valve chamber to selectively open or close the inflow valve port or the outflow valve port. The ball guide is disposed in the valve chamber to hold the ball valve coaxially with the inflow valve port and the outflow valve port. The ball guide has a communicate port communicated with the inflow valve port and the outflow valve port. The shaft displaces the ball valve. The electromagnetic solenoid part drives the shaft. The seat component has a cylindrical portion disposed inside of the housing, and has a predetermined depth in the axial direction. The inflow valve port passes through a first axial end of the cylindrical portion. The seal member having an annular shape is coupled with an outer circumference part of the housing at a position corresponding to an outer side of the cylindrical portion of the seat component.

Accordingly, the cylindrical portion of the seat component has a depth in the axial direction, and is disposed inside of the housing to form the inflow valve port. The electromagnetic valve includes the annular seal member fitted to the outer circumference part of the housing that is located on the outer side of the cylindrical portion of the seat component. The seal member raises the seal performance between the housing and the passage formation component which forms the upstream passage upstream of the housing. Further, a space for receiving the seal member is securable in the axial direction, since the seal member is fixed to the outer circumference part of the housing at the position corresponding to the outer side of the cylindrical portion of the seat component. Furthermore, because the seat component has the cylindrical portion, the seat component has the wide surface area able to be fixed to the housing, and the seal member can be fixed to the housing at a position far from the contact area between the seat component and the housing. As mentioned above, since the seal member can be arranged in the wide range of the housing, the seal member can be disposed without enlarging the outer diameter of the housing. Therefore, an electromagnetic valve can be provided to include a sealing component disposed on an outer side of the housing which has an oil inflow port while the outer diameter of the housing is restricted from increasing.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
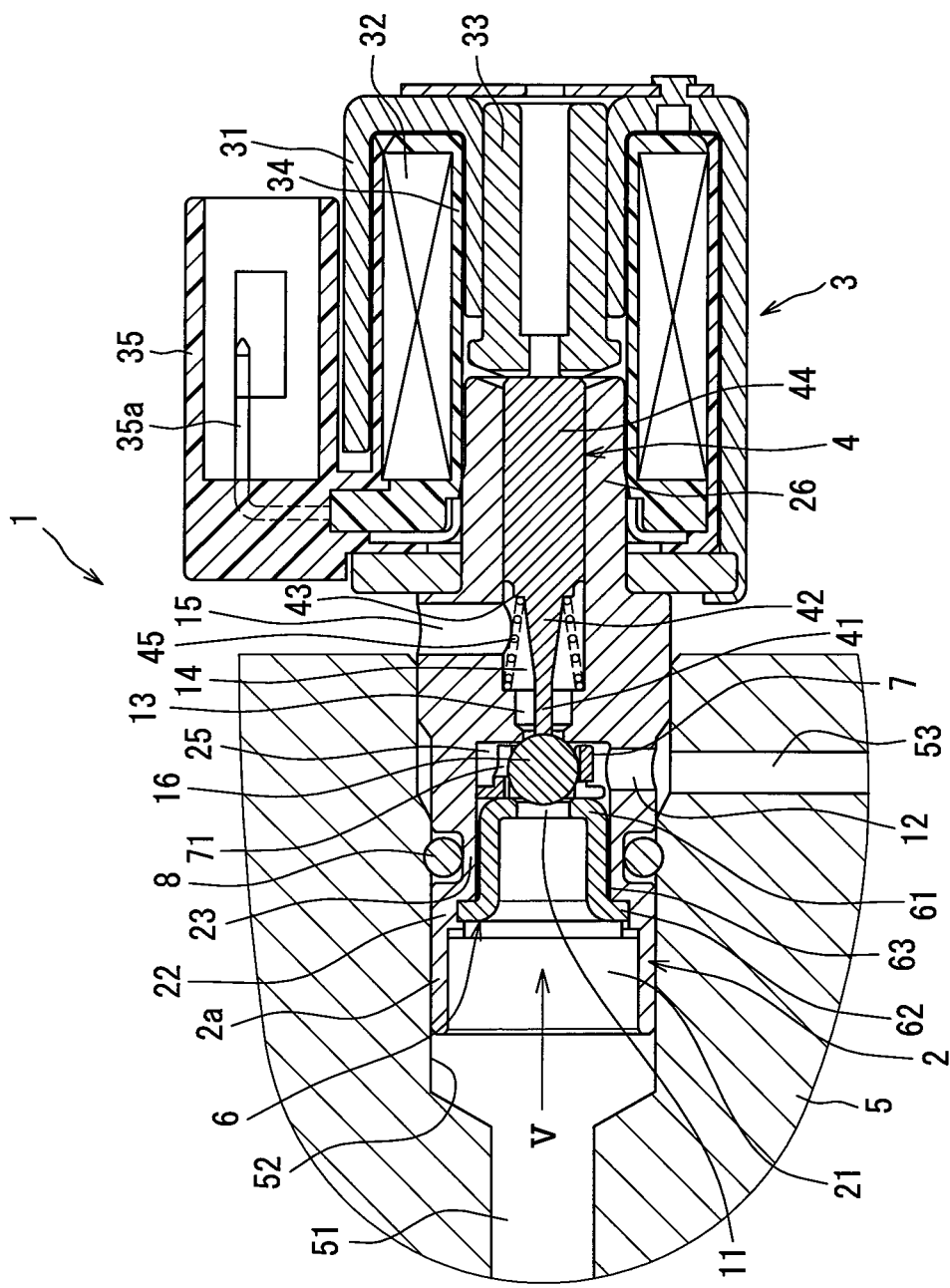
FIG. 1 is a sectional view illustrating an electromagnetic valve according to an embodiment.

An electromagnetic valve 1 according to an embodiment is explained referring to FIG. 1-FIG. 5. FIG. 1 shows the electromagnetic valve 1, for example, mounted to an automatic transmission of a vehicle. The electromagnetic valve 1 includes a passage control part, and an electromagnetic solenoid part 3 connected with the passage control part.

The passage control part includes a cylindrical housing 2 that has a tip side pipe part 2a. The tip side pipe part 2a is fitted to a cylindrical hole 52 formed in a passage formation component 5 of the automatic transmission. The housing 2 extends in the axial direction of the cylindrical hole 52. The passage formation component 5 has an oil inflow passage 51 through which oil flows with an adjusted pressure. The oil inflow passage 51 is communicated to an inflow valve port 11 in the opened state. The housing 2 has a shaft holding part 26 located opposite from the tip side pipe part 2a in the axial direction. The shaft holding part 26 holds a shaft 4, and is attached to the electromagnetic solenoid part 3.

A filter chamber 21 is formed inside the housing 2, and is positioned adjacent to the tip end. Oil flowing from the automatic transmission flows into the filter chamber 21 first in the electromagnetic valve 1. An oil filter which filters the oil (operation fluid) is located to cover the whole cross-section of the passage. The housing 2 has an outflow valve port 13 opposing to the inflow valve port 11 for oil in the axial direction. The housing 2 further has an outlet port 12 extended in the lateral direction perpendicular to the axial direction. The outlet port 12 is connected to an oil outflow passage 53 formed in the passage formation component 5 to communicate with a valve of the automatic transmission. Hereinafter, the side of the housing 2 adjacent to the passage formation component 5 is referred to an upstream side, but is not limited. The side of the housing 2 adjacent to the electromagnetic solenoid part 3 is referred to a downstream side, but is not limited.

The housing 2 has a valve chamber 25 located between the inflow valve port 11 and the outflow valve port 13. The valve chamber 25 is communicated with the inflow valve port 11, the outflow valve port 13, and the outlet port 12. The ball valve 16 is held in the valve chamber 25. The ball valve 16 exhibits a valve function to selectively open and close the inflow valve port 11 or the outflow valve port 13 by operations to be mentioned later.

The ball guide 7 having a cylindrical shape is inserted into the valve chamber 25. The ball guide 7 holds the ball valve 16 coaxially with the inflow valve port 11 and the outflow valve port 13. The cylindrical inner wall surface of the ball guide 7 receives and guides the ball valve 16 to reciprocate in the axial reciprocation.

The ball guide 7 has a communicate port 71 communicated to the inflow valve port 11 and the outflow valve port 13. The communicate port 71 is a hole part passing through the cylinder wall of the ball guide 7. The ball guide 7 has plural communicate ports 71, for example, arranged at equal interval in the circumference direction. Therefore, if the ball guide 7 rotates in the valve chamber 25, oil can be discharged to the outlet port 12 through a small-loss passage distance where the loss is small.

The seat component 6 is fixed between the downstream end of the filter chamber 21 and the upstream end of the valve chamber 25, and has the inflow valve port 11. The seat component 6 is a cylindrical object extending inside the housing 2 in the axial direction. In other words, the seat component 6 is a based cylindrical object which has an open end opened greatly and a bottom 61 at the other end in the axial direction. It is desirable that the seat component 6 is a cylindrical object. For example, the seat component 6 is manufactured by drawing into the shape of based cylinder by a cold press processing. The center of the bottom 61 has a coaxial penetration hole 61a which corresponds to the inflow valve port 11. The seat component 6 is a component of a valve seat, because the inflow valve port 11 of the bottom 61 is closed by the ball valve 16 when the ball valve 16 contacts the bottom 61 of the seat component 6.

The seat component 6 has the flange part 62 at the other end opposite from the bottom 61 having the inflow valve port 11 in the axial direction. The outer diameter of the flange part 62 is larger than that of the cylindrical portion 63. The flange part 62 has a ring shape projected radially, i.e., perpendicularly to the cylindrical portion 63 at the upstream end of the cylindrical portion 63. The flange part 62, the cylindrical portion 63, and the penetration hole 61a are formed coaxially with each other.

The cylindrical portion 63 is fixed by being fitted to the outer circumference part 23 of the housing 2. Therefore, the cylindrical portion 63 is in the tight contact with the outer circumference part 23 of the housing 2, and the seat component 6 is installed coaxially with the outflow valve port 13 or the ball valve 16. Since the cylindrical portion 63 and the penetration hole 61a share the same axis, the inflow valve port 11 and the outflow valve port 13 will also share the same axis. Thus, the electromagnetic valve 1 can exhibit a proper centering (alignment) function.

The seat component 6 may be fixed by inserting the flange part 62 into the housing 2. Therefore, the flange part 62 is in the tight contact with the housing 2, and the seat component 6 is installed coaxially with the outflow valve port 13 or the ball valve 16. Since the flange part 62 and the penetration hole 61a share the same axis, the inflow valve port 11 and the outflow valve port 13 will also share the same axis. Also in this case, the electromagnetic valve 1 can exhibit a proper centering (alignment) function.

Furthermore, the seat component 6 may be fixed by fitting both the flange part 62 and the cylindrical portion 63 to the housing 2. According to this, the total area which contributes to the alignment function becomes large, and the components can be stably fixed to have the same axis.

Figure 5:
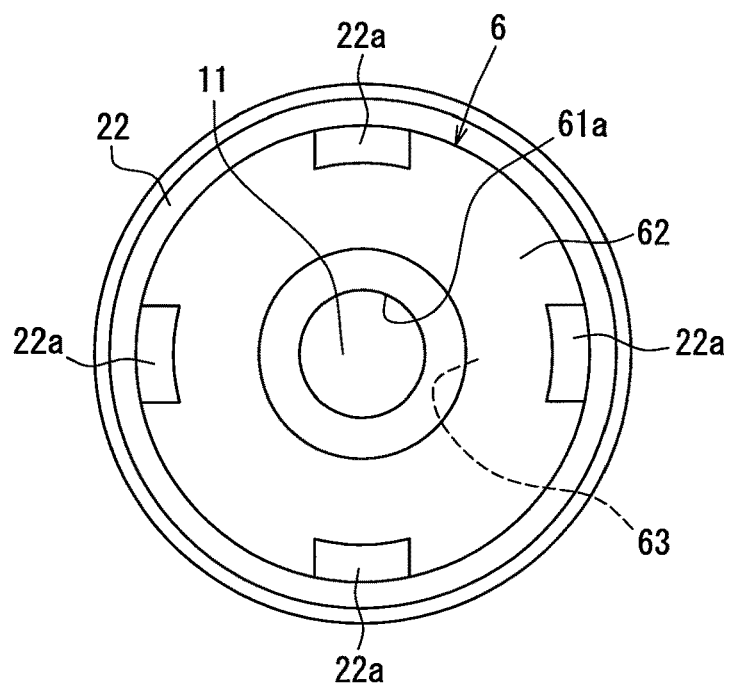
FIG. 5 is a view illustrating a plastically-deformed part of the seat component seen in an arrow direction V of FIG. 1.

The seat component 6 is integrally fixed to the housing 2 through the flange part 62. Specifically, at this time, a part 22a of a protrusion part 22 of the housing 2 plastically deforms the flange part 62 inward in the radial direction. The protrusion part 22 has an inside diameter larger than that of the outer circumference part 23, and is located between the downstream end of the filter chamber 21 and the upstream end of the outer circumference part 23. As shown in FIG. 5, the protrusion part 22 defines plural plastically-deformed portions, for example, arranged at equal interval in the circumference direction. At this time, the protrusion part 22 may be also plastically deformed.

Oil with pressure higher than that of gas fuel circulates in the electromagnetic valve 1 as operation fluid. In order to control oil leak, the electromagnetic valve 1 has the O ring seal 8 mounted around the outer circumference part 23 of the housing 2 at the position corresponding to the outer side of the cylindrical portion 63 of the seat component 6. The O ring seal 8 is an annular seal member inserted into a groove formed in all the circumferences of the outer circumference part 23. The O ring seal 8 is fitted to the outer circumference part 23 at the position corresponding to the outer side of the cylindrical portion 63 having the outer diameter smaller than that of the flange part 62. Therefore, the outer circumference part 23 is a support part supporting the seat component, and is also a support part supporting the O ring seal. The groove can be formed using a difference between the outer diameter of the outer circumference part 23 (housing 2) and the outer diameter of the cylindrical portion 63. The groove may be formed by a recess recessed from the outer surface of the housing 2 at the position corresponding to the cylindrical portion 63, not the flange part 62, because the outer diameter of the cylindrical portion 63 is smaller than that of the flange part 62. Therefore, the diameter size of the groove can be made small, compared with a conventional case where an O ring seal is installed around the circumference of the seat component having a disk shape. Thus, the outer diameter of the housing 2 can be reduced.

Because the seat component 6 is a cylindrical object, e.g., having a cup shape, the O ring seal 8 can be arranged within a wide range corresponding to the axial length of the side wall of the seat component 6 extending in the axial direction. This cannot be achieved by the conventional valve with the seat component having the disk shape. According to the electromagnetic valve 1, an annular seal member can be fixed without affecting the installation space of each component in the housing 2.

Figure 2:
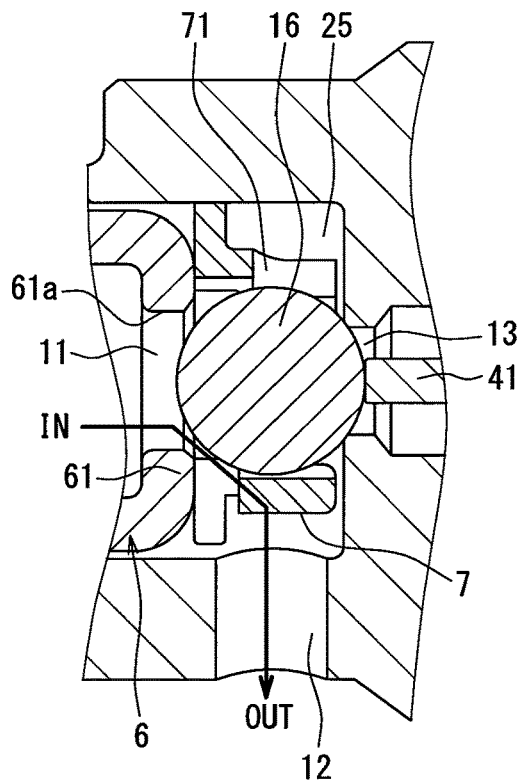
FIG. 2 is an enlarged view illustrating a ball valve that opens an inflow valve port in the electromagnetic valve of the embodiment.

The ball valve 16 is displaced by the shaft 4 disposed on downstream of the valve chamber 25 and driven by the electromagnetic solenoid part 3. The ball valve 16 is seated selectively between the bottom 61 around the inflow valve port 11 and a wall part of the housing 2 around the outflow valve port 13. As shown in FIG. 2, when the ball valve 16 is seated on the wall part around the outflow valve port 13, the oil inflow passage 51 is prevented from communicating with the external discharge passage 15 extending to outside, and is allowed to communicate with the oil outflow passage 53. Thereby, the oil flowing through the oil inflow passage 51 passes through the inflow valve port 11, the communicate port 71, the outlet port 12, and the oil outflow passage 53.

Figure 3:
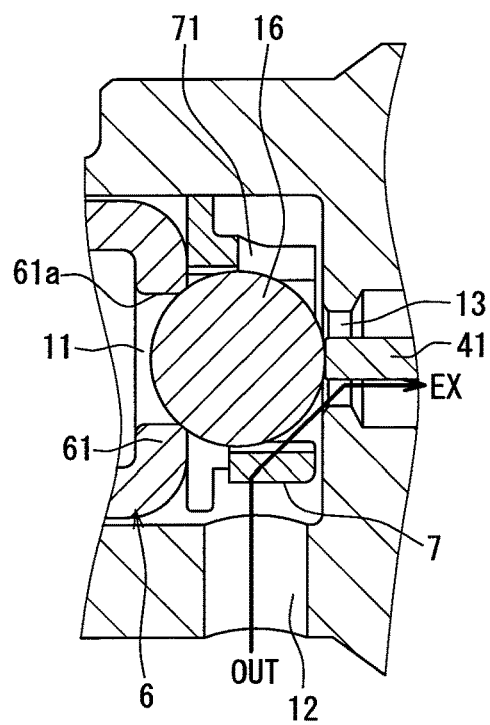
FIG. 3 is an enlarged view illustrating the ball valve that opens an outflow valve port in the electromagnetic valve of the embodiment.
Figure 4:
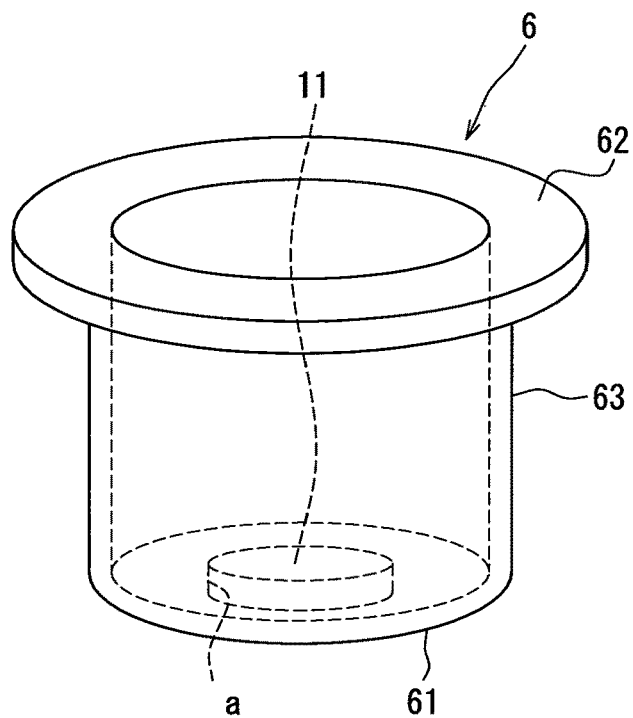
FIG. 4 is a perspective view illustrating a seat component of the electromagnetic valve of the embodiment.

As shown in FIG. 3, when the ball valve 16 is seated on the bottom 61 around the inflow valve port 11, the oil outflow passage 53 is prevented from communicating with the oil inflow passage 51, and is allowed to communicate with the external discharge passage 15. Thereby, the oil flowing from the oil outflow passage 53 passes the outlet port 12, the communicate port 71, the outflow valve port 13, and the external discharge passage 15, and is discharged to outside.

The electromagnetic solenoid part 3 disposed at the downstream side of the housing 2 includes a yoke 31, a bobbin 34, a coil 32, a movable element 33, a shaft 4, a spring 45, and a connector 35. The bobbin 34 is formed in the shape of an approximately cylinder made of resin material, and is prepared inside the yoke 31. The coil 32 is wound around the outer circumference of the bobbin 34. The yoke 31 is made of magnetic material. The yoke 31 supports the inner circumference side of the bobbin 34 and covers the outer circumference side of the coil 32. The yoke 31 is arranged coaxially with the bobbin 34. The bobbin 34 is arranged coaxially with the housing 2, and a portion of the housing 2 which supports the shaft 4 in the slidable manner is disposed inside the bobbin 34. The yoke 31, the movable element 33, and the shaft 4 are coaxially arranged with the housing 2, similar to the bobbin 34.

The movable element 33 has a cylindrical shape and is made of magnetic material. The movable element 33 is supported by the yoke 31, and is able to reciprocate in the axial direction. In the electromagnetic solenoid part 3, a magnetic circuit is formed with the movable element 33 and the yoke 31.

A large diameter part 44 of the shaft 4 is coaxially fixed to the end surface of the movable element 33 adjacent to the bottom. The shaft 4 and the movable element 33 are integrally able to reciprocate in the axial direction. The shaft 4 integrally has a small diameter part 41, a taper part 42 and the large diameter part 44. The small diameter part 41 is located at the upstream end, coaxially with the outflow valve port 13. The taper part 42 is located in the discharge passage 14. The large diameter part 44 is slidably inserted in the shaft holding part 26 through a protruding part 43. The discharge passage 14 is connected to the external discharge passage 15 formed on the downstream side of the housing 2. The external discharge passage 15 is a passage defined in the housing 2 at the position upstream of the shaft holding part 26, and extends in the direction perpendicular to the discharge passage 14.

The spring 45 corresponding to an example of elastic component is interposed between the protruding part 43 and the outflow valve port 13. The spring 45 continuously applies a biasing force to press the shaft 4 toward the movable element 33. The ball valve 16 disposed in the valve chamber 25 is pressed toward the movable element 33 by the oil pressure. When the electromagnetic solenoid part 3 is not energized, the shaft 4 is biased by the spring force of the spring 45, and the oil pressure presses the shaft 4 toward the movable element 33 through the ball valve 16. Thus, the ball valve 16 opens the inflow valve port 11, and closes the outflow valve port 13.

The connector 35 is press-fitted in the bobbin 34 or the yoke 31, and is located on the lateral side of the yoke 31. The connector 35 supplies electric power to the coil 32, and an internal terminal 35a of the connector 35 is electrically connected with the coil 32. The electromagnetic solenoid part 3 is able to control the current supplied to the coil 32 by electrically connecting the terminal 35a of the connector 35 to a current control device.

Next, the operation of the electromagnetic valve 1 is explained. As shown in FIG. 1, the electromagnetic valve 1 is attached to the automatic transmission in a manner that the tip side pipe part 2a of the housing 2 is fitted to the hole 52 of the passage formation component 5 and that the outlet port 12 and the oil outflow passage 53 are connected with each other. When the coil 32 of the electromagnetic solenoid part 3 is not energized, the shaft 4 is biased by the spring force of the spring 45 in the direction to separate from the ball valve 16. Since the ball valve 16 is pressed to the downstream side by the oil pressure, the ball valve 16 closes the outflow valve port 13. In this state, the oil inflow passage 51 and the oil outflow passage 53 are allowed to communicate with each other. The oil flowing from the oil inflow passage 51 passes through the inflow valve port 11, the communicate port 71, and the outlet port 12 so as to flow into the oil outflow passage 53.

When the coil 32 is energized in this state, magnetic flux will occur in the magnetic circuit formed of the movable element 33 the yoke 31. The movable element 33 is attracted in the axial direction toward the upstream side of the housing 2, and is moved leftward in FIG. 1 so as to move the shaft 4 against the biasing force of the spring 45 and the oil pressure.

As a result, the ball valve 16 moves to the seat component 6, and closes the inflow valve port 11. Thereby, the oil outflow passage 53 and the external discharge passage 15 are permitted to communicate with each other. The oil flowing from the oil outflow passage 53 passes through the outlet port 12, the communicate port 71, and the outflow valve port 13, and is discharged from the external discharge passage 15 to the outside. Thus, when the current supplied to the coil 32 is stared or stopped, the pressure of control liquid in the oil outflow passage 53 can be controlled (ON/OFF). Thereby, the pressure or flow rate of the control liquid used for controlling an object can be controlled.

Advantages achieved by the electromagnetic valve 1 of the embodiment are explained. The electromagnetic valve 1 includes the housing 2 having the outflow valve port 13, the outlet port 12, inflow valve port 11, and the valve chamber 25 communicated with the outflow valve port 13 and the outlet port 12. The electromagnetic valve 1 includes the ball valve 16 which opens and closes the inflow valve port 11 or the outflow valve port 13 alternatively, and the ball guide 7 which holds the ball valve 16 in the valve chamber 25 coaxially with the inflow valve port 11 and the outflow valve port 13. The electromagnetic valve 1 includes the shaft 4 which displaces the ball valve 16, the electromagnetic solenoid part 3 which drives the shaft 4, the seat component 6 which is a cylindrical object having a depth in the axial direction and disposed inside of the housing 2, and the O ring seal 8. The seat component 6 has the inflow valve port 11 passing through the bottom 61 which is an axial end of the cylindrical object. The O ring seal 8 is an annular seal member mounted around the outer circumference part 23 of the housing 2 at the position corresponding to the outer side of the cylindrical portion 63 of the seat component 6.

According to the electromagnetic valve 1, the outer diameter of the housing 2 is not increased. Therefore, it is not necessary to change the size of the components such as the ball valve 16, the ball guide 7, the spring 45, and shaft 4 compared with a conventional product. Thus, general-purpose components can be used, and the cost of the product can be reduced. Moreover, since it is not necessary to change the axial position of the inflow valve port 11 from a conventional product, it is not necessary to change the spatial relationship of the other components.

The seat component 6 has the flange part 62 on the second axial end of the cylindrical object opposite from the first axial end where the inflow valve port 11 passes through in the axial direction. The flange part 62 is fixed to the housing 2 by being plastically deformed at a part of the housing 2. Since the flange part 62 has a disk-shape, the same equipment for processing (plastically deforming) can be used as a conventional disk-shape seat component. Therefore, the manufacturing cost can be reduced by using common equipment for assembling the seat component to the housing.

The O ring seal 8 can be fixed to the outer circumference part of the housing 2 at the position corresponding to the outer side of the cylindrical portion 63 having the outer diameter smaller than that of the flange part 62. The seat component 6 which is a cylindrical object having the depth in the axial direction can be arranged inside of the housing 2, and has the inflow valve port 11. The electromagnetic valve 1 includes the O ring seal 8 fixed to the outer circumference part 23 of the housing 2 located on the outer side of the cylindrical portion 63 of the seat component 6. The O ring seal 8 improves the seal performance between the housing 2 and the passage formation component 5 which form the upstream passage upstream of the housing 2. Thus, the product nature of the electromagnetic valve 1 can be improved. Since the O ring seal 8 is fitted to the outer circumference part 23 at the position corresponding to the outer side of the cylindrical portion 63 of the seat component 6 which is a cylindrical object, the space for installing the O ring seal 8 is securable in the axial direction of the housing 2.

Since the seat component 6 is a cylindrical object, the seat component 6 has the wide surface area able to be fixed to the housing 2. The O ring seal 8 can be arranged at a suitable position of the housing 2 far from the fix part of the seat component 6. As mentioned above, since the housing 2 has the wide range to which the O ring seal 8 is able to be mounted, the O ring seal 8 can be fixed without enlarging the outside dimension of the housing 2.

The cylindrical portion 63 of the seat component 6 is fitted to the housing 2. Accordingly, the cylindrical portion 63 is in the tight contact with the outer circumference part 23 of the housing 2. The seat component 6 can be fitted to the outer circumference part 23 through the wide range in the axial direction. Therefore, the seat component 6 can be stably installed coaxially with the outflow valve port 13 or the ball valve 16. Furthermore, since the cylindrical portion 63 has a predetermined length in the axial direction, the contact are between the seat component 6 and the housing 2 is large in the axial direction. Therefore, the seat component 6 can be easily assembled to the housing 2 in the state where an angle between the flange part 62 and the axial center is right angle. According to the electromagnetic valve 1, the inflow valve port 11 and the outflow valve port 13 are defined to have the same axis. Compared with a conventional disk-shaped seat component, the seat component 6 can be easily attached in the state where the centering (alignment) is properly secured.

The flange part 62 of the seat component 6 is fitted into the housing 2, and the flange part 62 is in the tight contact with the housing 2. The seat component 6 can be fixed to the housing 2 at the position where the outer diameter is large. Due to the tight fitting at the flange part 62, the seat component 6 can be stably fixed coaxially with the outflow valve port 13 or the ball valve 16.

While the desirable embodiment of the present disclosure is described, the present disclosure is not restricted to the embodiment mentioned, and can be implemented with various modification in the range not deviating from the scope of the present disclosure. The scope of the present disclosure is not limited to the range exemplified with the structure of the embodiment. The range of the present disclosure is shown by the appended claims, and also includes all the changes in the equivalence.

The O ring seal 8 is an example of a seal member. The seal member for the electromagnetic valve 1 is not limited to the rubber component with the circular cross-section. The seal member may be made of elastically deformable material other than rubber, and the cross-sectional form may be a rectangle.

Such changes and modifications are to be understood as being within the scope of the present disclosure as defined by the appended claims.

What is claimed is:
1. An electromagnetic valve comprising:
    a housing having
        an outflow valve port for oil corresponding to operation fluid, the outflow valve port opposing an inflow valve port in an axial direction,
        an outlet port defined on a lateral side of the housing, and
        a valve chamber located between the inflow valve port and the outflow valve port, and communicated with the inflow valve port, the outflow valve port, and the outlet port;
    a ball valve disposed in the valve chamber to selectively open or close the inflow valve port or the outflow valve port;
    a ball guide disposed in the valve chamber to hold the ball valve coaxially with the inflow valve port and the outflow valve port, the ball guide having a communication port communicated with the inflow valve port and the outflow valve port;
    a shaft that displaces the ball valve;
    an electromagnetism solenoid part that drives the shaft;

a seat component having a cylindrical portion disposed inside of the housing and having a predetermined depth in the axial direction, the inflow valve port located adjacent to a first axial end of the cylindrical portion, the inflow valve port is defined in a bottom of the seat component having a diameter less than an inner diameter of the cylindrical portion; and a seal member having an annular shape and coupled with an outer circumference part of the housing at a position corresponding to an outer side of the cylindrical portion of the seat component, wherein the ball valve seats on the bottom of the seat component so as to close the inflow valve port, the cylindrical portion has a constant inner diameter between the first axial end adjacent to the inflow valve port and a second axial end adjacent to a flange part, and the diameter of the inflow valve port is less than the constant inner diameter of the cylindrical portion.

2. The electromagnetic valve according to claim 1, wherein
the seal member is fitted to the outer circumference part of the housing at the position corresponding to the outer side of the cylindrical portion where an outer diameter of the cylindrical portion is smaller than that of the flange part.

3. The electromagnetic valve according to claim 1, wherein
the cylindrical portion of the seat component is fitted to the housing.

4. The electromagnetic valve according to claim 1, wherein
the flange part of the seat component is fitted into the housing.

5. The electromagnetic valve according to claim 1, wherein
the diameter of the inflow valve port is less than an inner diameter of a part of the cylindrical portion immediately adjacent to the first axial end.

6. The electromagnetic valve according to claim 1, wherein
the inflow valve port is further defined by a penetration hole formed in a center portion of the bottom of the seat component.

7. The electromagnetic valve according to claim 6, wherein
the flange part, the cylindrical portion and the penetration hole are formed coaxially with each other.

8. The electromagnetic valve according to claim 6, wherein
the cylindrical portion, the penetration hole, the inflow valve port and the outflow valve port share an axis thereby allowing the electromagnetic valve to be properly centered.

9. The electromagnetic valve according to claim 1, wherein
an outer diameter of the cylindrical portion is less than an outer diameter of the flange part.

10. The electromagnetic valve according to claim 1, wherein
the seal member is disposed in a groove formed in the outer circumference part of the housing.

11. The electromagnetic valve according to claim 10, wherein
the seal member further includes an O ring seated in the groove.

12. The electromagnetic valve according to claim 1, wherein
a part of a protrusion part of the housing plastically deforms the flange part outward in a radial direction.

13. The electromagnetic valve according to claim 1, wherein
the shaft is disposed downstream of the valve chamber; and
the ball valve seats selectively between the bottom of the seat component and a wall part of the housing around the outflow valve port.

14. The electromagnetic valve according to claim 1, wherein
the seat component has a cup shape and the ball valve is housed in the valve chamber that is defined outside of the seat component.

15. The electromagnetic valve according to claim 14, wherein
the cup shaped seat component includes the cylindrical portion and the bottom, and has a constant thickness therebetween.

* * * * *